United States Patent
Zhang et al.

(10) Patent No.: US 11,247,336 B2
(45) Date of Patent: Feb. 15, 2022

(54) POINT STABILIZATION CONTROL METHOD AND APPARATUS FOR A MOBILE ROBOT

(71) Applicants: Bozhon Precision Industry Technology Co., Ltd., Jiangsu (CN); Suzhou Bozhon Robot Co., Ltd., Jiangsu (CN)

(72) Inventors: Xiang Zhang, Jiangsu (CN); Yanyu Su, Jiangsu (CN); Dongyu Shen, Jiangsu (CN); Peng Zhang, Jiangsu (CN)

(73) Assignees: BOZHON PRECISION INDUSTRY TECHNOLOGY CO., LTD., Jiangsu (CN); SUZHOU BOZHON ROBOT CO., LTD., Jiangsu (CN)

(*) Notice: Subject to any disclaimer, the term of this patent is extended or adjusted under 35 U.S.C. 154(b) by 0 days.

(21) Appl. No.: 16/628,491

(22) PCT Filed: Nov. 14, 2018

(86) PCT No.: PCT/CN2018/115376
§ 371 (c)(1),
(2) Date: Jan. 3, 2020

(87) PCT Pub. No.: WO2020/024478
PCT Pub. Date: Feb. 6, 2020

(65) Prior Publication Data
US 2021/0138644 A1    May 13, 2021

(30) Foreign Application Priority Data
Aug. 2, 2018   (CN) .......................... 201810869740.7

(51) Int. Cl.
*B25J 9/16*   (2006.01)
*B25J 5/00*   (2006.01)
*B25J 13/08*  (2006.01)

(52) U.S. Cl.
CPC ............. *B25J 9/1664* (2013.01); *B25J 5/007* (2013.01); *B25J 9/163* (2013.01); *B25J 9/1697* (2013.01); *B25J 13/089* (2013.01)

(58) Field of Classification Search
CPC ........ B25J 9/1664; B25J 9/163; B25J 9/1697; B25J 13/089; B25J 5/007
See application file for complete search history.

(56) References Cited

U.S. PATENT DOCUMENTS 9,367,067 B2 * 6/2016 Gilmore ............... G05D 1/0808
2003/0204382 A1 10/2003 Julier et al.
(Continued)

FOREIGN PATENT DOCUMENTS

CN   102087530 A   6/2011
CN   102359784 A   2/2012
(Continued)

OTHER PUBLICATIONS

Supplementary European Search Report completed Feb. 5, 2021, for related Application No. EP18923763.
(Continued)

*Primary Examiner* — Nicholas Kiswanto
(74) *Attorney, Agent, or Firm* — Burns & Levinson, LLP; Joseph M. Maraia

(57) ABSTRACT

A point stabilization control method includes determining a first displacement of the robot relative to the target object according to a position of the target object and an initial position of the robot; determining a to-be-offset displacement according to the first displacement and a second displacement of the target object relative to a target point and determining a target motion rate and a target motion direction of the robot according to the to-be-offset displacement and a mapping relation of a motion rate, a motion direction and the to-be-offset displacement; determining a (Continued)

current position of the robot according to the target motion rate and the target motion direction; and using the current position as the initial position and returning to the preceding steps until a distance between the current position of the robot and a position of the target point is less than a preset threshold.

20 Claims, 7 Drawing Sheets

(56) References Cited

U.S. PATENT DOCUMENTS

| | | | |
|---|---|---|---|
| 2008/0077283 | A1 | 3/2008 | Ueyama et al. |
| 2013/0116908 | A1* | 5/2013 | Oh .................. H04W 4/027 |
| | | | 701/96 |
| 2016/0018822 | A1* | 1/2016 | Nevdahs .............. G05D 1/0094 |
| | | | 701/26 |
| 2017/0108874 | A1 | 4/2017 | Peters et al. |
| 2017/0345164 | A1* | 11/2017 | Guerreiro ............... G06T 7/292 |
| 2018/0143641 | A1* | 5/2018 | Rao .................. B60W 60/0011 |
| 2018/0267540 | A1* | 9/2018 | Sonoura .............. G05D 1/0221 |
| 2018/0307233 | A1* | 10/2018 | Zhu .................. G01C 21/3415 |
| 2021/0026356 | A1* | 1/2021 | Kobayashi ........... G05D 1/0212 |

FOREIGN PATENT DOCUMENTS

| | | |
|---|---|---|
| CN | 104354157 A | 2/2015 |
| CN | 105929849 A | 9/2016 |
| CN | 106647738 A | 5/2017 |
| CN | 106843280 A | 6/2017 |
| CN | 107085428 A | 8/2017 |
| CN | 107300919 A | 10/2017 |
| CN | 107703973 A | 2/2018 |
| CN | 108255174 A | 7/2018 |

OTHER PUBLICATIONS

Milford, M. et al: "Hybrid Robot Control and SLAM for Persistent Navigation and Mapping," Robotics and Autonomous Systems, Elsevier BV, Amsterdam, NL, vol. 58, No. 9, Sep. 30, 2010 (Sep. 30, 2010), pp. 1096-1104, XP027189636, ISSN: 0921-8890.

Fabregas, Ernesto et al: "Teaching Control in Mobile Robotics with V-REP and a Khepera IV library", 2016 IEEE Conference on Control Applications (CCA), IEEE, Sep. 19, 2016 (Sep. 19, 2016), pp. 821-826, XP032978086, DOI: 10.1109/CCA.2016.7587920.

Oh, S. et al: "Autonomous Battery Recharging for Indoor Mobile Robots", Australian National University, Aug. 30, 2000 (Aug. 30, 2000), XP055321836,* Abstact, Sections 1.3-3.3, Figures 3-6, 7, 8.

Yan, Xiao-zhao et al: "Point Stabilization of Wheeled Mobile Robots Based on Artificial Potential Field," China Academic Journal Electronic Publishing House, Dec. 31, 2009, pp. 189-191, 1008-0570(2009) 08-2-0189-03.

Zhang, Xiang et al: "Position-Loop Based Cross-Coupled and Synchronization Control of a Parallel Kinematics Machine," 2017 13th IEEE Conference on Automation Science and Engineering (CASE) Xi'an, China, Aug. 20-23, 2017. pp. 112-117.

International Search Report from PCT Application No. PCT/CN2018/115376, dated May 6, 2019.

* cited by examiner

POINT STABILIZATION CONTROL METHOD AND APPARATUS FOR A MOBILE ROBOT

CROSS REFERENCE TO RELATED APPLICATIONS

This application is a United States national phase application under 35 U.S.C. 371 of International Patent Application Number PCT/CN2018/115376, filed on Nov. 14, 2018, which claims priority to Chinese Patent Application No. 201810869740.7, entitled "Point Stabilization Control Method And Apparatus For A Mobile Robot", filed on Aug. 2, 2018, disclosures of which are incorporated herein by reference in their entireties for all purposes.

TECHNICAL FIELD

The present disclosure relates to the robot control technology, for example, a point stabilization control method and apparatus for a mobile robot.

BACKGROUND

With the development of the communication technology and the electronic technology, mobile robots have been widely used in industrial environments. For example, automatic loading has been achieved through mobile robots or automatic charging of mobile robots has been achieved. In the industrial application of mobile robots, how to implement point stabilization control of mobile robots is very important.

In the related art, the point stabilization control of a robot is implemented using the following method: acquiring the actual position and the target position of the robot, and controlling the motion direction and the motion distance of the robot according to the offset between the actual position and the target position of the robot.

However, in the preceding point stabilization control method, it is impossible to adjust the offset according to the actual motion direction and motion distance of the robot, resulting in poor control precision.

SUMMARY

The present disclosure provides a point stabilization control method and apparatus for a mobile robot, which can solve the problem of poor control precision of a point stabilization control method for a mobile robot in the related art.

An embodiment provides a point stabilization control method for a mobile robot. The method includes acquiring a position of a target object; determining a first displacement of the robot relative to the target object according to the position of the target object and an initial position of the robot; in accordance with the first displacement and relative position of the target object and a target point, determining a target motion rate and a target motion direction of the robot according to the to-be-offset displacement and a mapping relation of a motion rate, a motion direction and the to-be-offset displacement; determining a current position of the robot according to the target motion rate and the target motion direction; and using the current position as the initial position and returning to the steps from determining the first displacement of the robot relative to the target object according to the position of the target object and the initial position of the robot to determining the current position of the robot according to the target motion rate and the target motion direction until a distance between a real position of the robot and a position of the target point is less than a preset threshold.

An embodiment provides a point stabilization control apparatus for a mobile robot. The apparatus includes a determination module, which is configured to determine a first displacement of the robot relative to the target object according to the position of the target object and an initial position of the robot; to determine a to-be-offset displacement of the robot according to the first displacement and a second relative position of the target object relative to a target point and to determine a target motion rate and a target motion direction of the robot according to the to-be-offset displacement and a mapping relation of a motion rate, a motion direction and the to-be-offset displacement; to determine a current position of the robot according to the target motion rate and the target motion direction; and to use the current position as the initial position and return to the steps from determining the first displacement of the robot relative to the target object according to the position of the target object and the initial position of the robot to determining the current position of the robot according to the target motion rate and the target motion direction until a distance between real position of the robot and a position of the target point is less than a preset threshold.

An embodiment provides an electronic device. The electronic device includes at least one processor; and a memory, which is configured to store at least one program which, when executed by the at least one processor, causes the at least one processor to perform the point stabilization control method for a mobile robot as described in the first aspect.

An embodiment provides a computer-readable storage medium, which is configured to store at least one computer program which, when executed by at least one processor, perform the point stabilization control method for a mobile robot as described in the first aspect.

DETAILED DESCRIPTION

Figure 1:
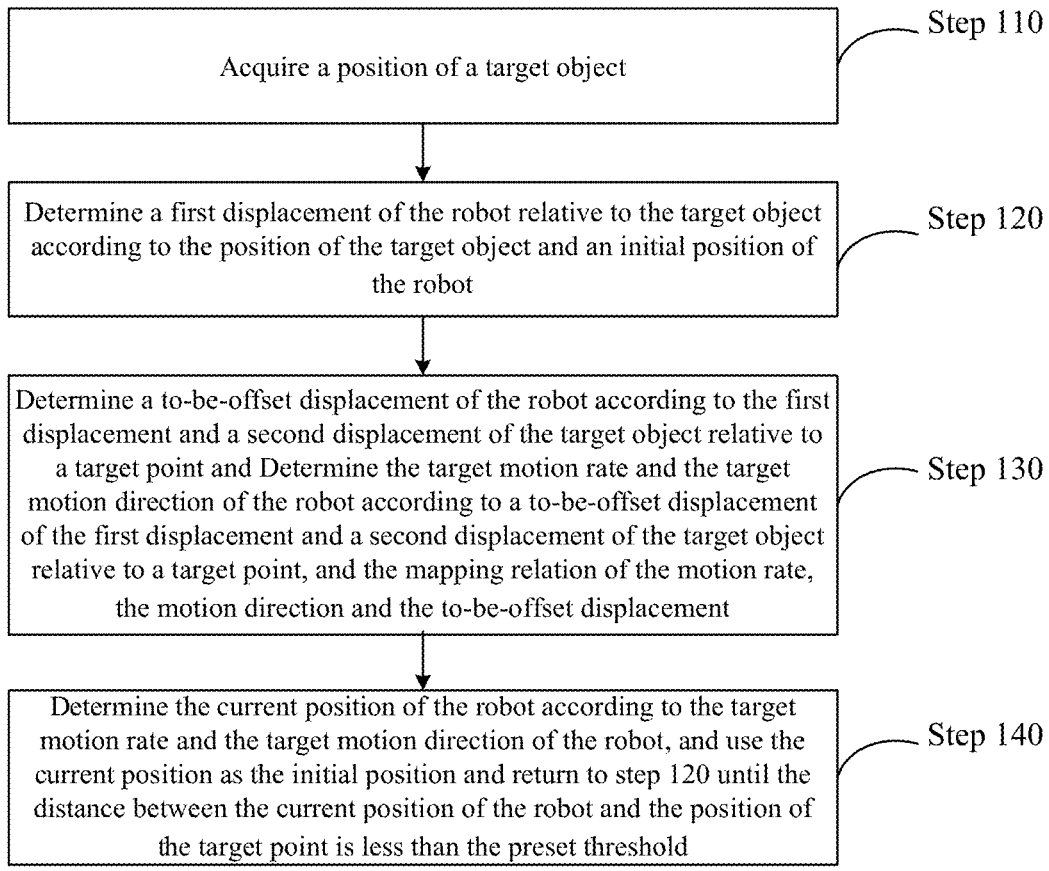
FIG. 1 is a flowchart of a point stabilization control method for a mobile robot according to an embodiment.

FIG. 1 is a flowchart of a point stabilization control method for a mobile robot according to this embodiment. As shown in FIG. 1, the point stabilization control method for a mobile robot provided in this embodiment includes the steps described below.

In step 110, the position of a target object is acquired.

The point stabilization control method for a mobile robot of this embodiment is to study how to design and implement feedback control such that the robot maintains the desired posture. In practical industrial applications, point stabilization control problems often occur in a scenario where a mobile robot reaches the desired posture with relatively high precision, such as automatic loading and automatic charging scenarios.

In this embodiment, the method is performed by the point stabilization control system of the mobile robot and the system runs in the mobile robot.

During the control process, the mobile robot needs to acquire the position of the target object. The target object here refers to an object having a fixed distance from the target point to which the mobile robot is to reach. The target object may have a fixed shape that facilitates recognition by the mobile robot.

Figure 4:
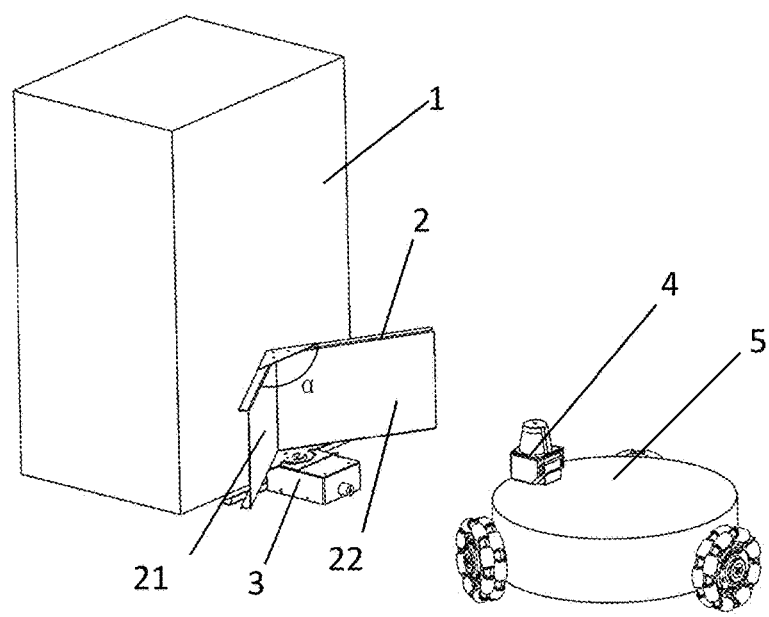
FIG. 4 is a schematic diagram of the point stabilization system of the embodiment as shown in FIG. 1.

FIG. 4 is a schematic diagram of the point stabilization system of the embodiment as shown in FIG. 1. As shown in FIG. 4, the target object 2 is disposed on a processing device 1. The mobile robot 5 may acquire the contour of an object in a preset range by using a lidar sensor. The position of the target object is determined when it is determined that the contour of the object is the contour of the target object. The target object 2 of FIG. 4 includes a first mounting plate 21 and a second mounting plate 22 having a length greater than or equal to a preset length. One end of the first mounting plate 21 and one end of the second mounting plate 22 are fixedly connected to each other to form an opening angle α greater than a preset angle. The preset length is 12 cm and the preset angle is 120 degrees. The target object may be of other shapes. The target object of FIG. 4 is easy to deploy in practical industrial applications.

In an implementation, when the lidar sensor 4 determines that the contour of the acquired object is the contour of the target object 2, the position of the target object may be determined by laser ranging.

In this implementation, whether the object is the target object is determined according to the contour of the object, that is, whether the target object is recognized is determined according to the geometric features of the object; the robustness is relatively strong.

In another implementation, the mobile robot may acquire the position of the target object in other manners, for example, according to information input by the user.

In step 120, a first displacement of the robot relative to the target object is determined according to the position of the target object and the initial position of the robot.

In step 130, the target motion rate and the target motion direction of the robot are determined according to the to-be-offset displacement of the first displacement and a second displacement of the target object relative to a target point, and the mapping relation of the motion rate, the motion direction and the to-be-offset displacement.

In step 140, the current position of the robot is determined according to the target motion rate and the target motion direction of the robot, and the current position is used as the initial position and the process returns to step 120 until the distance between the current position of the robot and the position of the target point is less than the preset threshold.

In an embodiment, after the position of the target object is acquired, the first displacement of the robot relative to the target object is determined according to the position of the target object and the initial position of the robot. Specifically, that is, the magnitude of the first displacement and the direction of the first displacement are determined according to the position of the target object and the initial position of the robot. In step 120, the current position of the robot is updated in real time. In each cycle, the control amount of the robot, that is, the target motion rate and the target motion direction of the robot, is determined according to the first displacement and the second displacement. Then the current position of the robot is determined according to the control amount of the robot. With this current position used as the initial position described in step 120, the preceding steps are repeated until the distance between the current position of the robot and the position of the target point is less than the preset threshold. In this way, the point stabilization control of the robot is completed. The set threshold range varies with different application scenarios. The smaller the set threshold range, the higher the corresponding precision. The threshold for a scenario with high precision is at millimeter level (1-10 mm) while the threshold for a scenario with general precision is at centimeter level (1-10 cm).

In an embodiment, the position of the target object does not vary during a complete point stabilization control process. The second displacement of the target object relative to the target point does not vary either. In this process, what varies is the current position of the robot.

Figure 2:
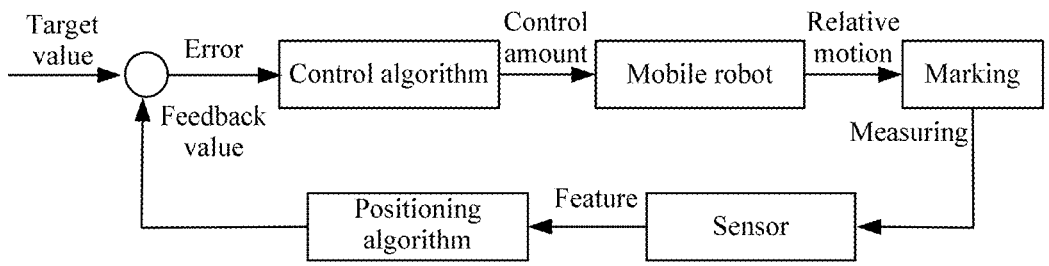
FIG. 2 is a flowchart of the point stabilization control method for a mobile robot of the embodiment as shown in FIG. 1.

FIG. 2 is a block diagram of the point stabilization control method for a mobile robot of the embodiment as shown in FIG. 1. As shown in FIG. 2, the block diagram of the point stabilization control method for a mobile robot shows a feedback control process: a target value and a feedback value are input, where the target value is the first displacement and the feedback value is the first displacement in this embodiment; the error is determined according to the target value and the feedback value, and the control amount, that is, the target motion rate and the target motion direction of the robot, is determined according to the error and a control algorithm; the robot moves according to the target motion rate and the target motion direction; the position after the motion is marked and the sensor acquires the features and the position of the target object; a new feedback value is determined according to the position of the robot after the motion and the position of the target object by using a positioning algorithm. Through this feedback control method, real-time precise control of the robot is achieved.

In an implementation, the step of determining the target motion rate and the target motion direction of the robot according to the first displacement and the second displacement includes determining the to-be-offset position of the robot according to the first displacement and the second displacement and determining the target motion rate and the target motion direction according to the to-be-offset position and the mapping relation of the motion rate, the motion direction and the to-be-offset position.

In this implementation, the mapping relation of the control amount and the offset position is preset. This mapping may be determined according to Proportion Integral Derivative (PID) control. In this implementation, first the to-be-offset position of the robot is determined according to the vector difference between the first displacement and the second displacement, where the to-be-offset position includes the to-be-offset angle and the to-be-offset distance; and then the control amount corresponding to the to-be-offset position, that is, the target motion rate and the target motion direction, is determined according to the set mapping relation.

In another implementation, the control amount of the robot may be determined according to the algorithm of an artificial vector field. This implementation will be described in detail in other embodiments.

When the current position of the robot is determined according to the target motion rate and the target motion direction of the robot, it is feasible to determine the motion distance according to the target motion rate of the robot and the duration in which the robot moves at the target motion rate, to determine the motion direction according to the target motion direction, and then to determine the current position of the robot according to the motion distance and the motion direction. Each of the positions involved in this embodiment is a vector including a size and a direction, that is, coordinate values of the position.

Figure 3:
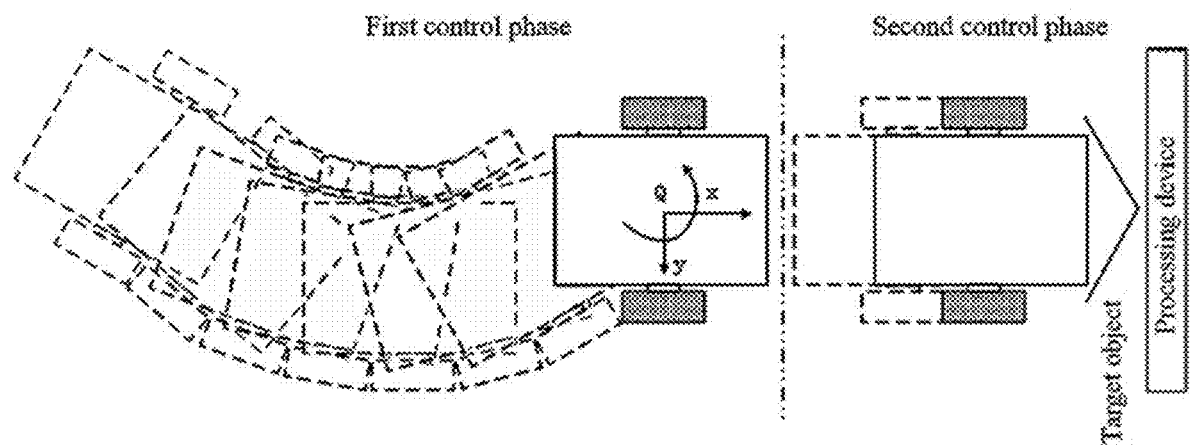
FIG. 3 is a diagram of a point stabilization control process of the embodiment as shown in FIG. 1.

FIG. 3 is a diagram of a point stabilization control process of the embodiment as shown in FIG. 1. As shown in FIG. 3, the point stabilization control process of this embodiment is divided into two phases: a first control phase where when the distance between the robot and the target object is greater than the set threshold, the target motion rate and the target motion direction are adjusted significantly (that is, to be greater than the adjustment threshold) so that the angular deviation of the mobile robot is relatively small; and a second control phase where when the distance between the robot and the target object is less than or equal to the set threshold, the target motion rate and the target motion direction are adjusted slightly (that is, to be less than or equal to the adjustment threshold) so that the robot reaches the target point.

Figure 5A:
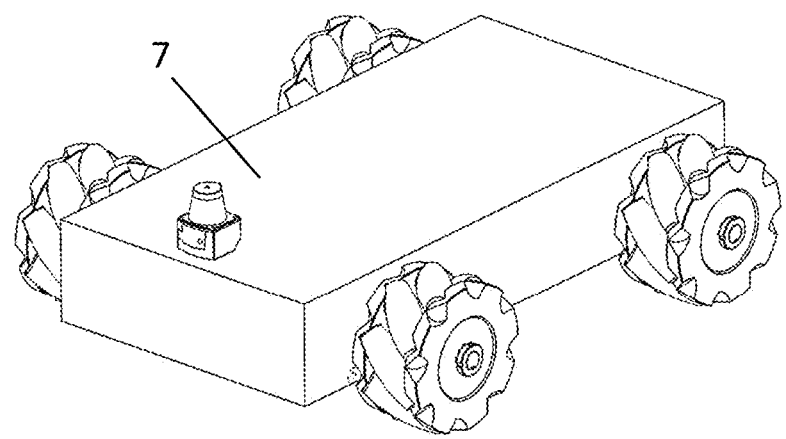
FIG. 5A is a schematic diagram of a first wheel system of the mobile robot of the embodiment as shown in FIG. 1.
Figure 5B:
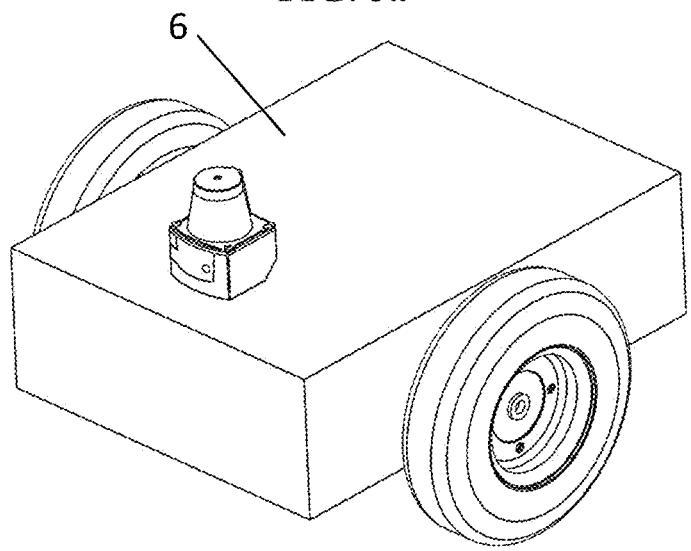
FIG. 5B is a schematic diagram of a second wheel system of the mobile robot of the embodiment as shown in FIG. 1.
Figure 5C:
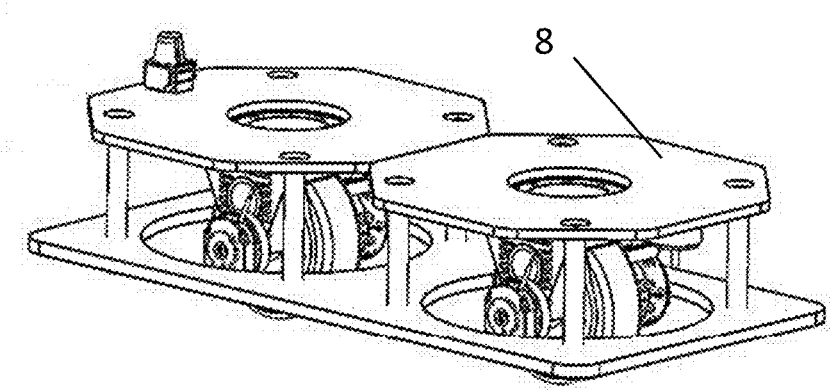
FIG. 5C is a schematic diagram of a third wheel system of the mobile robot of the embodiment as shown in FIG. 1.

In this embodiment, the robot uses any one of the following wheel systems: omni wheels, differential wheels, Mecanum wheels or helms. FIG. 5 illustrates schematic diagrams of the wheel system of the mobile robot of the embodiment as shown in FIG. 1. Referring to FIGS. 4 and 5, the wheel system of the robot 5 of FIG. 4 is omni wheels, the wheel system of the robot 7 of FIG. 5A is Mecanum wheels, the wheel system of the robot 6 of FIG. 5B is differential wheels, and the wheel system of the robot 8 of FIG. 5C is helms.

In an embodiment, the point stabilization control system of FIG. 4 further includes a cross sliding table adjustable mechanism 3. The mechanism is configured to adjust the position of the robot after the robot reaches the target point so that the robot can operate the processing device more precisely.

The point stabilization control method for a mobile robot provided in this embodiment includes acquiring the position of a target object; determining a first displacement of the robot relative to the target object according to the position of the target object and the initial position of the robot; determining the to-be-offset displacement of the robot according to the first displacement and a second displacement of the target object relative to a target point and determining the target motion rate and the target motion direction of the robot according to the to-be-offset displacement and the mapping relation of the motion rate, the motion direction and the to-be-offset displacement; determining the current position of the robot according to the target motion rate and the target motion direction; and using the current position as the initial position and returning to the steps from determining the first displacement of the robot relative to the target object according to the position of the target object and the initial position of the robot to determining the current position of the robot according to the target motion rate and the target motion direction until the distance between the current position of the robot and the position of the target point is less than the preset threshold. In this way, the control amount of the robot is adjusted through closed-loop control so that point stabilization control is achieved and the control precision is improved.

Figure 6:
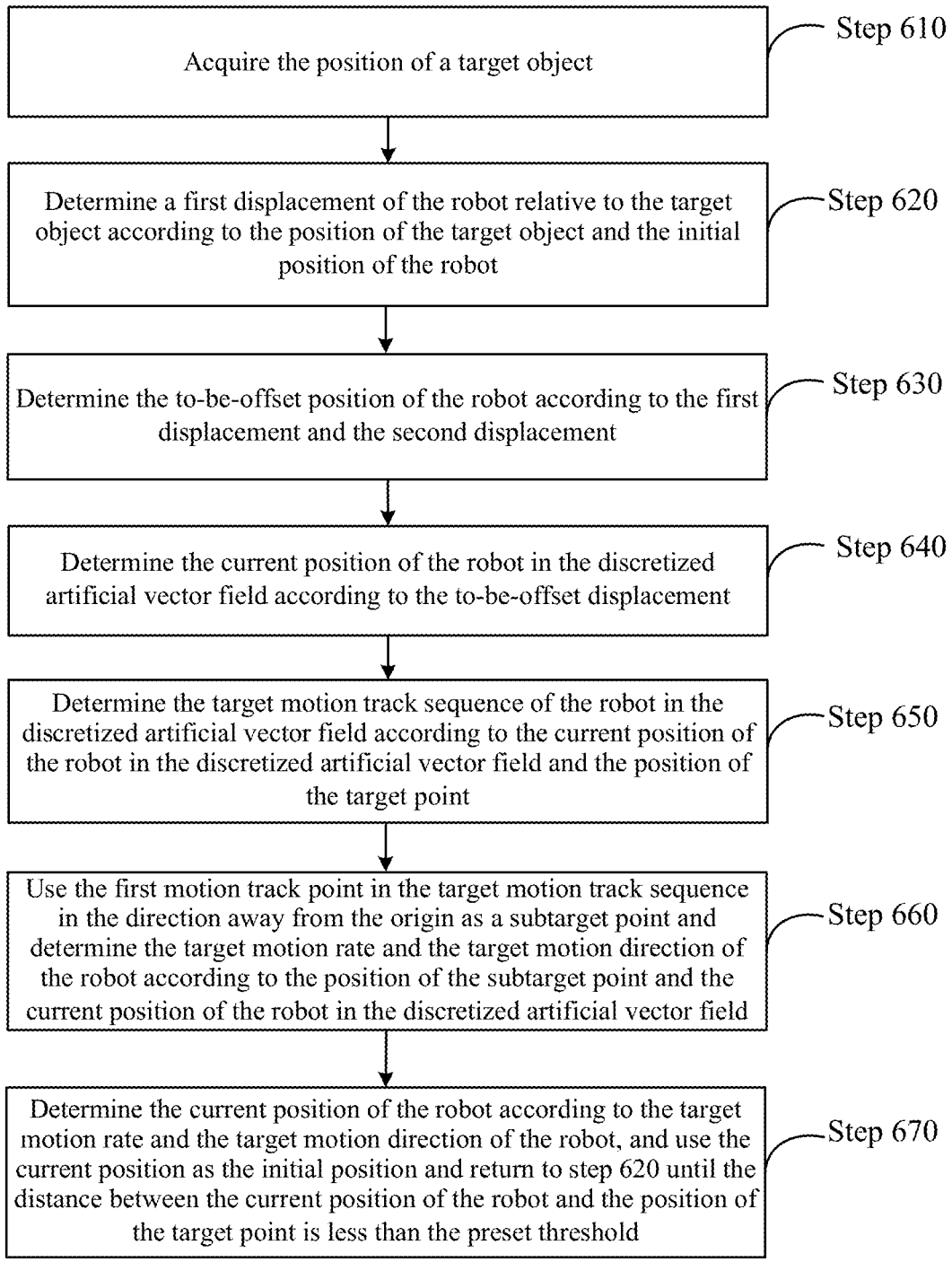
FIG. 6 is a flowchart of a point stabilization control method for a mobile robot according to another embodiment.

FIG. 6 is a flowchart of a point stabilization control method for a mobile robot according to another embodiment. Based on the embodiment as shown in FIG. 1, the steps included in step 120 are described in detail in this embodiment. As shown in FIG. 6, the point stabilization control method for a mobile robot provided in this embodiment includes the steps described below.

In step 610, the position of a target object is acquired.

The technical principle and implementation process of step 610 are similar to those of step 110 and will not be repeated here.

In step 620, a first displacement of the robot relative to the target object is determined according to the position of the target object and the initial position of the robot.

The technical principle and implementation process of step 620 are similar to those of step 120 and will not be repeated here.

In step 630, the to-be-offset position of the robot is determined according to the first displacement and the second displacement.

In an embodiment, the to-be-offset position of the robot is determined according to the vector difference between the first displacement and the second displacement.

In step 640, the current position of the robot in the discretized artificial vector field is determined according to the to-be-offset displacement.

The discretized artificial vector field is formed through discretization of an artificial vector field constructed according to to-be-offset displacement which is determined for the first time and the position of the target point. The position of the target point is an origin in the discretized artificial vector field.

Figure 7A:
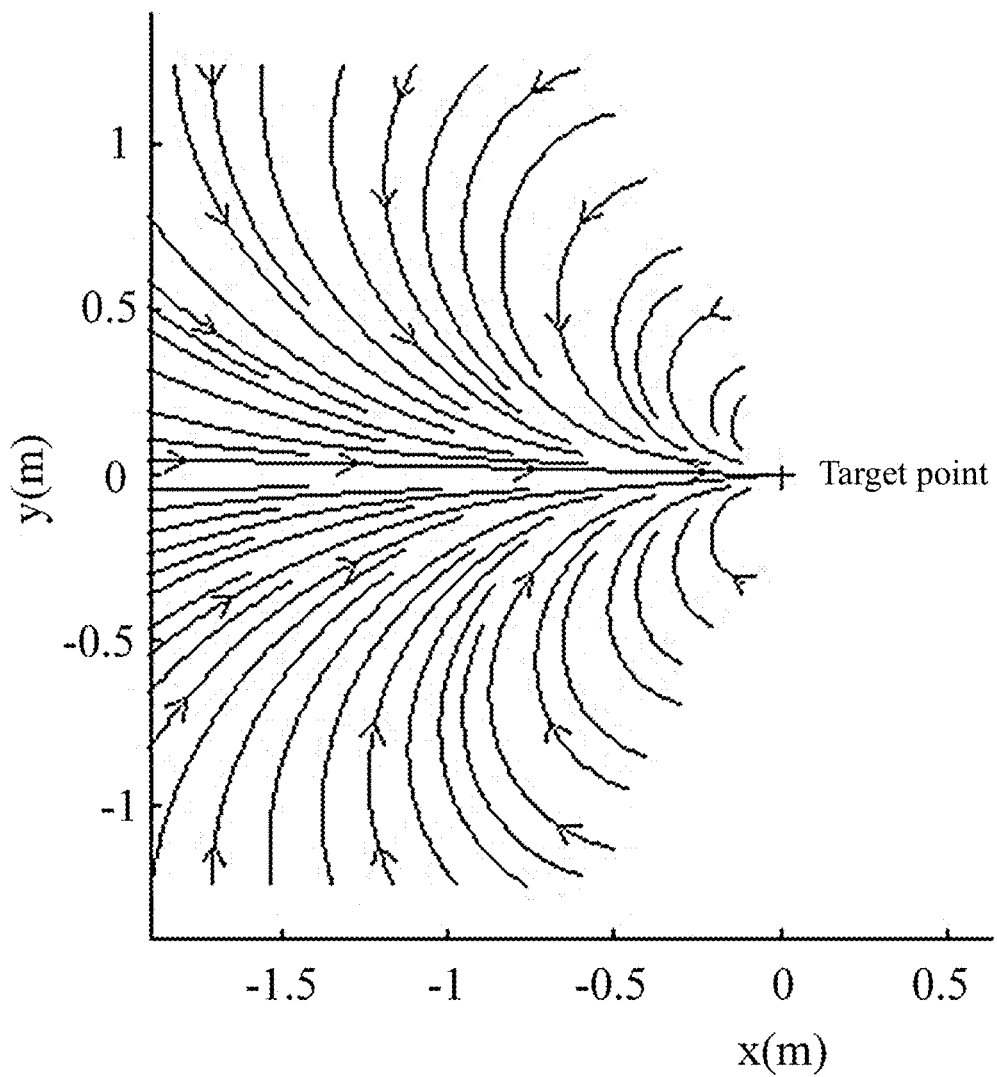
FIG. 7A is a schematic diagram of the artificial vector field of the embodiment as shown in FIG. 6.
Figure 7B:
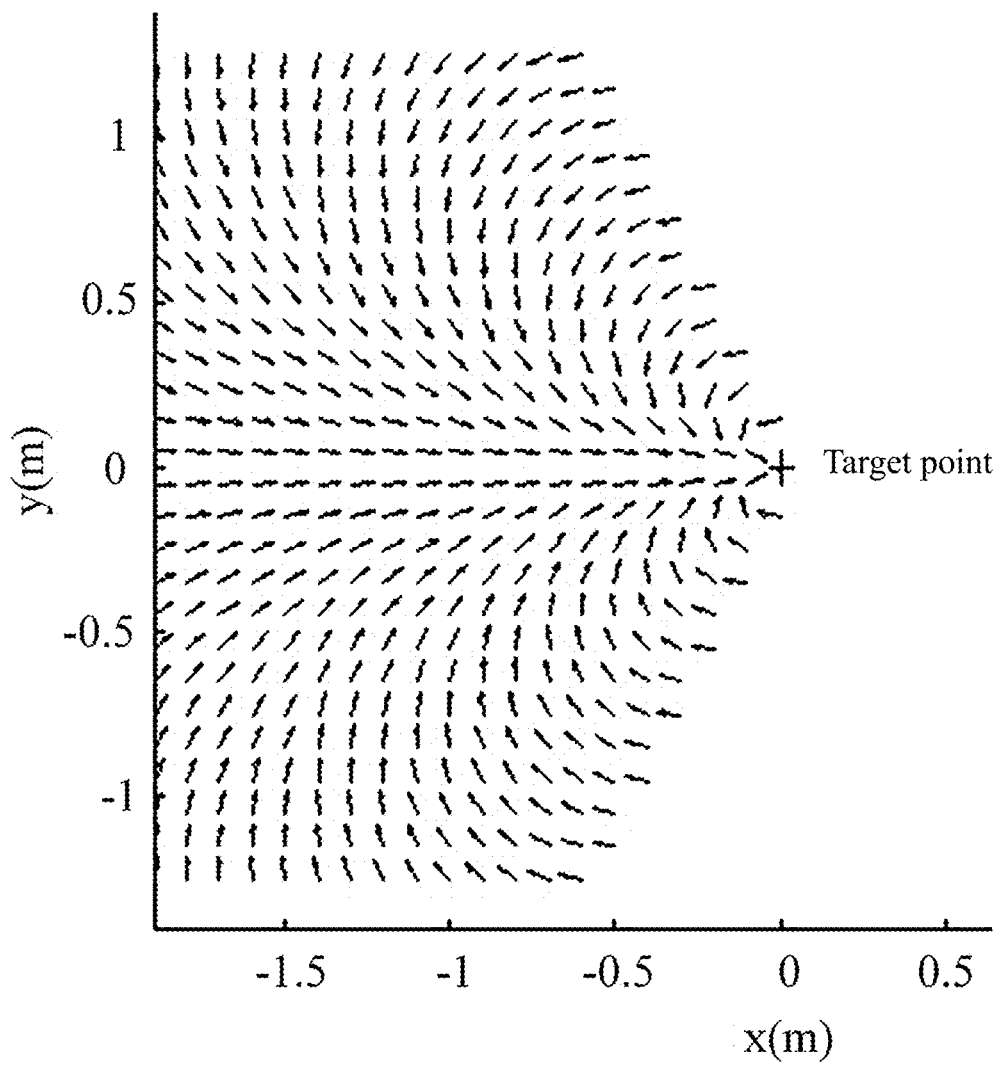
FIG. 7B is a schematic diagram of the discretized artificial vector field of the embodiment as shown in FIG. 6.

In an embodiment, FIG. 7A is a schematic diagram of the artificial vector field of the embodiment as shown in FIG. 6. FIG. 7B is a schematic diagram of the discretized artificial vector field of the embodiment as shown in FIG. 6. As shown in FIG. 7A, the artificial vector field is constructed according to the to-be-offset position determined for the first time and the position of the target point. The target point is set at the origin. The vector field is continuous. Through discretization of the vector field, the discretized artificial vector field as shown in FIG. 7B is obtained. The artificial vector field equalizes the robot into particles. The robot may be located at any position in the coordinate system. The potential function of the artificial vector field is used to determine the vector corresponding to the robot and thus to determine the direction of the forward motion of the robot. The controller is built using the artificial vector field. It is assumed that the target point is attractive in the desired angular direction, and when the robot deviates from this direction, an imaginary force enables the robot to automatically moves towards this direction.

The to-be-offset position is the vector difference between the first displacement and the second displacement. The to-be-offset position is substantially the vector difference between the robot and the target point. In the discretized artificial vector field, the target point is the origin, so the current position of the robot in the discretized artificial vector field can be determined according to the position of the target point in the discretized artificial vector field and the to-be-offset position.

In step 650, the target motion track sequence of the robot in the discretized artificial vector field is determined according to the current position of the robot in the discretized artificial vector field and the position of the target point.

The target motion track sequence includes a plurality of motion track points.

In an embodiment, after the current position of the robot in the discretized artificial vector field is determined, it is feasible to determine the target motion track sequence of the robot in the discretized artificial vector field according to the current position and the position of the target point.

In an embodiment, it is feasible to determine the actual deflection angle of the robot in the discretized artificial vector field according to the current position of the robot in the discretized artificial vector field and the mapping relation of the position of the robot in the discretized artificial vector field and the deflection angle of the robot; and to determine the target motion track sequence according to the actual deflection angle and the position of the target point.

In an embodiment, the mapping relation of the position of the robot in the discretized artificial vector field and the deflection angle of the robot is determined according to empirical data.

In another embodiment, the mapping relation of the position of the robot in the discretized artificial vector field and the deflection angle of the robot is determined according to a machine learning algorithm. In this implementation, the mapping relation may be determined using a machine learning algorithm. The learning process is as follows: an initial mapping is established; point stabilization control of the robot is performed according to the mapping and by use of the artificial vector field, the mapping is adjusted according to the error between the final position of the robot and the position of the target point; and for the purpose of reducing the error, an updated mapping is acquired, and with the updated mapping as the mapping, the step of the "point stabilization control method" is performed again until the final error is less than the preset error threshold. The finalized mapping is used as the mapping applied in the actual point stabilization control process.

In the case where the mapping is determined according to machine learning, the determined mapping relation of the position of the robot in the discretized artificial vector field and the deflection angle of the robot is more accurate and the precision of point stabilization control is further improved.

When the target motion track sequence is determined according to the actual deflection angle and the position of the target point, it is feasible to determine the target motion track sequence according to a preset algorithm of the discretized artificial vector field.

In step 660, the first motion track point in the target motion track sequence in the direction away from the origin is used as a subtarget point, and the target motion rate and the target motion direction of the robot are determined according to the position of the subtarget point and the current position of the robot in the discretized artificial vector field.

In an embodiment, a subtarget point is selected after the target motion track sequence is determined. The subtarget point is the first motion track point in the target motion track sequence in the direction away from the origin. In an embodiment, after the target motion track sequence is determined, the positions of the motion track points included in the target motion track sequence are also known.

Then the target motion rate and the target motion direction of the robot are determined according to the position of the subtarget point and the current position of the robot in the discretized artificial vector field. In this process, the target motion rate and the target motion direction of the robot may be determined according to the position of the subtarget point and the current position of the robot in the discretized artificial vector field by use of the preset algorithm of the discretized artificial vector field.

In step 670, the current position of the robot is determined according to the target motion rate and the target motion direction of the robot, and the current position is used as the initial position and the process returns to step 620 until the distance between the current position of the robot and the position of the target point is less than the preset threshold.

In this embodiment, the target motion track sequences determined by steps 620 through 650 are different with the update of the current position of the robot. For the target motion track sequence determined for each time, the first motion track point in the target motion track sequence in the direction away from the origin is used as a subtarget point, and the target motion rate and the target motion direction of the robot are determined according to the position of the subtarget point and the current position of the robot in the discretized artificial vector field.

The process of determining the current position of the robot according to the target motion rate and the target motion direction of the robot is the same as the process of step 120 and will not repeated here.

The point stabilization control method for a mobile robot provided in this embodiment includes determining the target motion track sequence of the robot in the discretized artificial vector field according to the current position of the robot in the discretized artificial vector field and the position of the target point; and using the first motion track point in the target motion track sequence in the direction away from the origin as a subtarget point and determining the target motion rate and the target motion direction of the robot according to the position of the subtarget point and the current position of the robot in the discretized artificial vector field. In this way, in the process of point stabilization control, the first motion track point in the target motion track sequence is used as a subtarget point, and the target motion rate and the target motion direction of the robot are determined according to the position of the subtarget point and the current position of the robot in the discretized artificial vector field. The target motion track sequence is split so that a finer control is achieved and the precision of point stabilization control is further improved.

Figure 8:
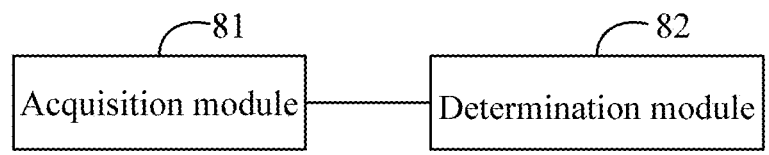
FIG. 8 is a structure diagram of a point stabilization control apparatus for a mobile robot according to an embodiment.

FIG. 8 is a structure diagram of a point stabilization control apparatus for a mobile robot according to this embodiment. As shown in FIG. 8, the point stabilization control apparatus for a mobile robot provided in this embodiment includes an acquisition module 81 and a determination module 82.

The acquisition module 81 is configured to acquire the position of a target object.

In an embodiment, the target object includes a first mounting plate and a second mounting plate, which have a length greater than or equal to a preset length, where one end of the first mounting plate and one end of the second mounting plate are fixedly connected to each other to form an opening angle greater than a preset angle. The preset length is 12 cm and the preset angle is 120 degrees.

In an embodiment, the acquisition module 81 is configured to acquire the contour of an object in a preset range by using a lidar sensor; and to determine the position of the target object when it is determined that the contour of the object is the contour of the target object.

The determination module 82 is configured to determine a first displacement of the robot relative to the target object according to the position of the target object and the initial position of the robot; to determine the target motion rate and the target motion direction of the robot according to the first displacement and a second displacement of the target object relative to a target point; to determine the current position of the robot according to the target motion rate and the target motion direction of the robot; and to use the current position as the initial position and return to the steps from determining the first displacement of the robot relative to the target object according to the position of the target object and the current position of the robot to determining the current position of the robot according to the target motion rate and the target motion direction until the distance between the current position of the robot and the position of the target point is less than the preset threshold.

In an embodiment, the determination module 82 is configured to determine the target motion rate and the target motion direction of the robot according to the second displacement of the target object relative to the target point and the first displacement. In an embodiment, the to-be-offset position of the robot is determined according to the first displacement and the second displacement, and the target motion rate and the target motion direction of the robot are determined according to the to-be-offset position and the mapping relation of the motion rate, the motion direction and the to-be-offset position.

In this embodiment, the robot uses any one of the following wheel systems: omni wheels, differential wheels, Mecanum wheels or helms.

The point stabilization control apparatus for a mobile robot provided in this embodiment can perform the point stabilization control method for a mobile robot provided in the embodiment as shown in FIG. 1. The point stabilization control apparatus has function modules and beneficial effects corresponding to the point stabilization control method.

Figure 9:
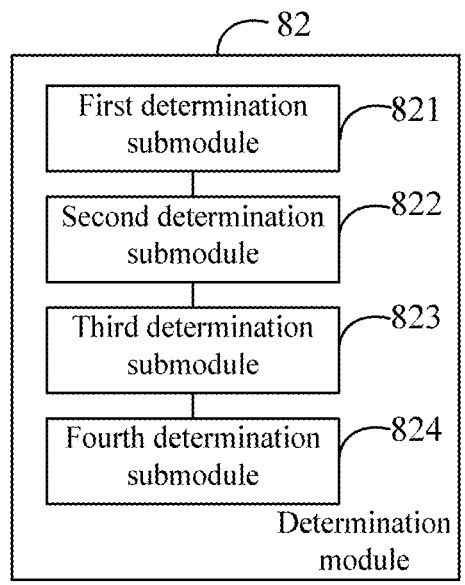
FIG. 9 is a structure diagram of a point stabilization control apparatus for a mobile robot according to another embodiment.

FIG. 9 is a structure diagram of a point stabilization control apparatus for a mobile robot according to another embodiment. Based on the embodiment as shown in FIG. 8, the submodules included in the determination module 82 are described in detail in this embodiment. As shown in FIG. 9, in this embodiment, the determination module 82 determines the target motion rate and the target motion direction of the robot after the determination according to the second displacement of the target object relative to a target point and the first displacement, and the determination module 82 includes a first determination submodule 821, a second determination submodule 822, a third determination submodule 823 and a fourth determination submodule 824.

The first determination submodule 821 is configured to determine the to-be-offset position of the robot according to the first displacement and the second displacement.

The second determination submodule 822 is configured to determine the current position of the robot in the discretized artificial vector field according to the to-be-offset position.

The discretized artificial vector field is formed through discretization of an artificial vector field constructed according to the first determined to-be-offset position and the position of the target point and the position of the target point is the origin in the discretized artificial vector field.

The third determination submodule 823 is configured to determine the target motion track sequence of the robot in the discretized artificial vector field according to the current position of the robot in the discretized artificial vector field and the position of the target point.

The target motion track sequence includes a plurality of motion track points.

In an embodiment, the third determination submodule 823 is configured to determine the actual deflection angle of the robot in the discretized artificial vector field according to the current position of the robot in the discretized artificial vector field and the mapping relation of the position of the robot in the discretized artificial vector field and the deflection angle of the robot; and to determine the target motion track sequence according to the actual deflection angle and the position of the target point.

The mapping relation of the position of the robot in the discretized artificial vector field and the deflection angle of the robot is configured to be determined according to empirical data or a machine learning algorithm.

The fourth determination submodule 824 is configured to use the first motion track point in the target motion track sequence in the direction away from the origin as a subtarget point and to determine the target motion rate and the target motion direction of the robot according to the position of the subtarget point and the current position of the robot in the discretized artificial vector field.

The point stabilization control apparatus for a mobile robot provided in this embodiment can perform the point stabilization control method for a mobile robot provided in the embodiment as shown in FIG. 6. The point stabilization control apparatus has function modules and beneficial effects corresponding to the point stabilization control method.

Figure 10:
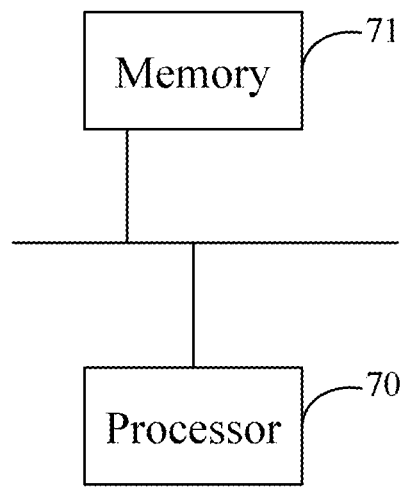
FIG. 10 is a structure diagram of an electronic device according to an embodiment.

FIG. 10 is a structure diagram of an electronic device according to this embodiment. As shown in FIG. 10, the electronic device includes a processor 70 and a memory 71. In the electronic device, one or more processors 70 are provided. FIG. 10 uses an example in which one processor 70 is provided. In the electronic device, the processor 70 and the memory 71 may be connected by a bus or connected in other manners. FIG. 10 uses an example in which a bus is used.

As a computer-readable storage medium, the memory 71 is configured to store a software program, a computer-executable program and a module such as a program instruction and a module (for example, the acquisition module 81 and the determination module 82 in the point stabilization control apparatus for a mobile robot) corresponding to the point stabilization control method for a mobile robot of this embodiment. The processor 70 executes the software program, instruction and module stored in the memory 71 to perform function applications and data processing of the electronic device, that is, to implement the point stabilization control method for a mobile robot.

The memory 71 may include a program storage region and a data storage region, where the program storage region may store an operating system and an application program required by at least one function while the data storage region may store data created depending on use of a terminal. In addition, the memory 71 may include a high-speed random access memory and a nonvolatile memory, such as at least one disk memory, a flash memory or other nonvolatile solid-state memories. In some embodiments, the memory 71 may further include a memory disposed remote from the processor 70. The remote memory may be connected to a device/terminal/server via a network. Examples of the preceding network include, but are not limited to, the Internet, an intranet, a local area network, a mobile communication network or a combination thereof.

This embodiment further provides a storage medium containing a computer-executable instruction that, when executed by a computer processor, implements a point stabilization control method for a mobile robot.

The method includes acquiring the position of a target object; determining a first displacement of the robot relative to the target object according to the position of the target object and the initial position of the robot; determining the to-be-offset displacement of the robot according to the first displacement and a second displacement of the target object relative to a target point and determining the target motion rate and the target motion direction of the robot according to the to-be-offset displacement and the mapping relation of the motion rate, the motion direction and the to-be-offset displacement; determining the current position of the robot according to the target motion rate and the target motion direction; and using the current position as the initial position and returning to the step of determining the first displacement of the robot relative to the target object according to the position of the target object and the initial position of the robot to the step of determining the current position of the robot according to the target motion rate and the target motion direction until the distance between the current position of the robot and the position of the target point is less than the preset threshold.

Of course, the computer-executable instruction contained in the storage medium provided in this embodiment is not limited to operations of the preceding point stabilization control method for a mobile robot and may cause the processor to perform operations of a point stabilization control method for a mobile provided in other embodiments.

From the description of embodiments, it will be apparent to those skilled in the art that the present disclosure may be implemented by means of software and necessary general-purpose hardware or may be implemented by hardware. The computer software product may be stored in a computer-readable storage medium such as a read-only memory (ROM), a random access memory (RAM), a flash memory, a hard disk or an optical disk. The computer software product includes instructions configured to cause a device (which may be a network device such as a personal computer or a server) to perform the point stabilization control method for a mobile robot described in the preceding embodiments.

It is to be noted that in the embodiments of the point stabilization control apparatus for a mobile robot, the included units and modules are divided only according to functional logic but are not limited to this division, and these units and modules may be divided in any manner as long as corresponding functions can be achieved; moreover, the names of the functional units are for the purpose of differentiation between the functional units and are not intended to limit the scope of the present application.

What is claimed is:

1. A point stabilization control method for a mobile robot, the method performed by at least one processor in a point stabilization control system of the mobile robot, the method comprising:

acquiring a position of a target object;

determining a first displacement of the robot relative to the target object according to the position of the target object and an initial position of the robot;

determining a to-be-offset displacement of the robot according to the first displacement and a second displacement of the target object relative to a target point, and determining a target motion rate and a target motion direction of the robot according to the to-be-offset displacement and a mapping relation of a motion rate, a motion direction and the to-be-offset displacement;

determining a current position of the robot according to the target motion rate and the target motion direction; and using the current position as the initial position and returning to the steps from determining the first displacement of the robot relative to the target object according to the position of the target object and the initial position of the robot to determining the current position of the robot according to the target motion rate and the target motion direction until a distance between the current position of the robot and a position of the target point is less than a preset threshold;

wherein the point stabilization control system runs in the mobile robot.

2. The method of claim 1, wherein the step of determining the to-be-offset displacement of the robot according to the first displacement and the second displacement of the target object relative to the target point, and determining the target motion rate and the target motion direction of the robot according to the to-be-offset displacement and the mapping relation of the motion rate, the motion direction and the to-be-offset displacement comprises:

determining the to-be-offset displacement of the robot according to the first displacement and the second displacement;

determining a current position of the robot in a discretized artificial vector field according to the to-be-offset displacement, wherein the discretized artificial vector field is formed through discretizing an artificial vector field constructed according to a to-be-offset displacement which is determined for the first time and the position of the target point, and the position of the target point is an origin in the discretized artificial vector field;

determining a target motion track sequence of the robot in the discretized artificial vector field according to the current position of the robot in the discretized artificial vector field and the position of the target point, wherein the target motion track sequence comprises a plurality of motion track points; and using a first motion track point in the target motion track sequence in a direction away from the origin as a subtarget point, and determining the target motion rate and the target motion direction of the robot according to a position of the subtarget point and the current position of the robot in the discretized artificial vector field.

3. The method of claim 2, wherein the step of determining the target motion track sequence of the robot in the discretized artificial vector field according to the current position of the robot in the discretized artificial vector field and the position of the target point comprises:

determining an actual deflection angle of the robot in the discretized artificial vector field according to the current position of the robot in the discretized artificial vector field and a mapping relation between a position of the robot in the discretized artificial vector field and a deflection angle of the robot; and determining the target motion track sequence according to the actual deflection angle and the position of the target point.

4. The method of claim 3, wherein the mapping relation between the position of the robot in the discretized artificial vector field and the deflection angle of the robot is configured to be determined according to empirical data; or the mapping relation between the position of the robot in the discretized artificial vector field and the deflection angle of the robot is configured to be determined according to a machine learning algorithm.

5. The method of claim 1, wherein the target object comprises a first mounting plate and a second mounting plate which have a length greater than or equal to a preset length, wherein one end of the first mounting plate and one end of the second mounting plate are fixedly connected to each other to form an opening angle greater than a preset angle.

6. The method of claim 5, wherein the preset length is 12 cm and the preset angle is 120 degrees.

7. The method of claim 1, wherein the step of acquiring the position of the target object comprises acquiring a contour of an object in a preset range by using a lidar sensor; and determining a position of the object as the position of the target object in response to determining that the contour of the object is a contour of the target object.

8. The method of claim 1, wherein the to-be-offset displacement is a vector difference between the first displacement and the second displacement.

9. The method of claim 1, wherein the robot uses any one of the following wheel systems:

omni wheels, differential wheels, Mecanum wheels or helms.

10. An electronic device, comprising:

at least one processor; and a memory, which is configured to store at least one program which, when executed by the at least one processor, causes the at least one processor to perform the following steps:

acquiring a position of a target object;

determining a first displacement of the robot relative to the target object according to the position of the target object and an initial position of the robot;

determining a to-be-offset displacement of the robot according to the first displacement and a second displacement of the target object relative to a target point, and determining a target motion rate and a target motion direction of the robot according to the to-be-offset displacement and a mapping relation of a motion rate, a motion direction and the to-be-offset displacement;

determining a current position of the robot according to the target motion rate and the target motion direction; and using the current position as the initial position and returning to the steps from determining the first displacement of the robot relative to the target object according to the position of the target object and the initial position of the robot to determining the current position of the robot according to the target motion rate and the target motion direction until a distance between the current position of the robot and a position of the target point is less than a preset threshold;

wherein the electronic device is provided in a point stabilization control system of a mobile robot and the point stabilization control system runs in the mobile robot.

11. A computer-readable non-transitory storage medium for a mobile robot, which is configured to store a computer program which, when executed by a processor, perform the following steps:

acquiring a position of a target object;

determining a first displacement of the robot relative to the target object according to the position of the target object and an initial position of the robot;

determining a to-be-offset displacement of the robot according to the first displacement and a second displacement of the target object relative to a target point, and determining a target motion rate and a target motion direction of the robot according to the to-be-offset displacement and a mapping relation of a motion rate, a motion direction and the to-be-offset displacement;

determining a current position of the robot according to the target motion rate and the target motion direction; and using the current position as the initial position and returning to the steps from determining the first displacement of the robot relative to the target object according to the position of the target object and the initial position of the robot to determining the current position of the robot according to the target motion rate and the target motion direction until a distance between the current position of the robot and a position of the target point is less than a preset threshold.

12. The method of claim 2, wherein the target object comprises a first mounting plate and a second mounting plate which have a length greater than or equal to a preset length, wherein one end of the first mounting plate and one end of the second mounting plate are fixedly connected to each other to form an opening angle greater than a preset angle.

13. The method of claim 3, wherein the target object comprises a first mounting plate and a second mounting plate which have a length greater than or equal to a preset length, wherein one end of the first mounting plate and one end of the second mounting plate are fixedly connected to each other to form an opening angle greater than a preset angle.

14. The method of claim 4, wherein the target object comprises a first mounting plate and a second mounting plate which have a length greater than or equal to a preset length, wherein one end of the first mounting plate and one end of the second mounting plate are fixedly connected to each other to form an opening angle greater than a preset angle.

15. The method of claim 2, wherein the preset length is 12 cm and the preset angle is 120 degrees.

16. The method of claim 3, wherein the preset length is 12 cm and the preset angle is 120 degrees.

17. The method of claim 4, wherein the preset length is 12 cm and the preset angle is 120 degrees.

18. The method of claim 2, wherein the step of acquiring the position of the target object comprises acquiring a contour of an object in a preset range by using a lidar sensor; and determining a position of the object as the position of the target object in response to determining that the contour of the object is a contour of the target object.

19. The method of claim 3, wherein the step of acquiring the position of the target object comprises acquiring a contour of an object in a preset range by using a lidar sensor; and determining a position of the object as the position of the target object in response to determining that the contour of the object is a contour of the target object.

20. The method of claim 4, wherein the step of acquiring the position of the target object comprises acquiring a contour of an object in a preset range by using a lidar sensor; and determining a position of the object as the position of the target object in response to determining that the contour of the object is a contour of the target object.

\* \* \* \* \*